USOO5491721A

United States Patent [19]
Cornelius et al.

[11] Patent Number: 5,491,721
[45] Date of Patent: Feb. 13, 1996

[54] MODEM POWERING METHOD AND APPARATUS

[75] Inventors: Gurley D. Cornelius, Toney; Randell C. Frost, Gurley, both of Ala.

[73] Assignee: Motorola, Inc., Schaumburg, Ill.

[21] Appl. No.: 200,791

[22] Filed: Feb. 23, 1994

[51] Int. Cl.[6] ........................ H04B 1/38
[52] U.S. Cl. ........................ 375/222; 379/93
[58] Field of Search ............... 375/8, 222; 379/93, 379/98, 298; 455/127, 343

[56] References Cited

U.S. PATENT DOCUMENTS

| | | | |
|---|---|---|---|
| 3,745,251 | 7/1973 | Fretwell | 375/8 |
| 4,701,946 | 10/1987 | Olivia et al. | 379/98 |
| 4,951,309 | 8/1990 | Gross et al. | 379/98 |
| 4,996,706 | 2/1991 | Cho | 379/93 |

Primary Examiner—Stephen Chin
Assistant Examiner—Tesfaldet Bocure
Attorney, Agent, or Firm—Nancy R. Gamburd; Wayne J. Egan

[57] ABSTRACT

A modem (106) is arranged with a power control circuit (113) for controlling the power flow to the modem, based on the modem's data activity. After initial data activity is established (303), the power control circuit monitors the modem to determine when the data activity ceases. When the power control circuit determines that modem activity is no longer present (305), it releases a power-control relay (114), thus powering-down the modem (307). The power control circuit then continues to monitor the modem to determine when data activity returns. When the power control circuit determines that modem activity has returned (309), it operates the power-control relay, thus powering-up the modem (311). Normal data activity now continues (313).

17 Claims, 3 Drawing Sheets

MODEM POWERING METHOD AND APPARATUS

FIELD OF THE INVENTION

This application relates to modems including, but not limited to, a modem powering method and apparatus.

BACKGROUND OF THE INVENTION

Analog modems are used for data communications between terminals or computers over dial-up and dedicated telephone lines. These modems typically have power applied continuously but are often used for only minutes a day. Considering the large installed base of modems, this adds up to large amounts of wasted power. In many cases power availability at a modem user site is severely limited. This causes complicated and often expensive methods to provide additional power for modem installation.

Efforts have been made to design low power modems. This has generally resulted in trade-offs in modem features and functionality as sacrifices were made in order to save power.

DESCRIPTION OF THE PREFERRED EMBODIMENT

Figure 1:
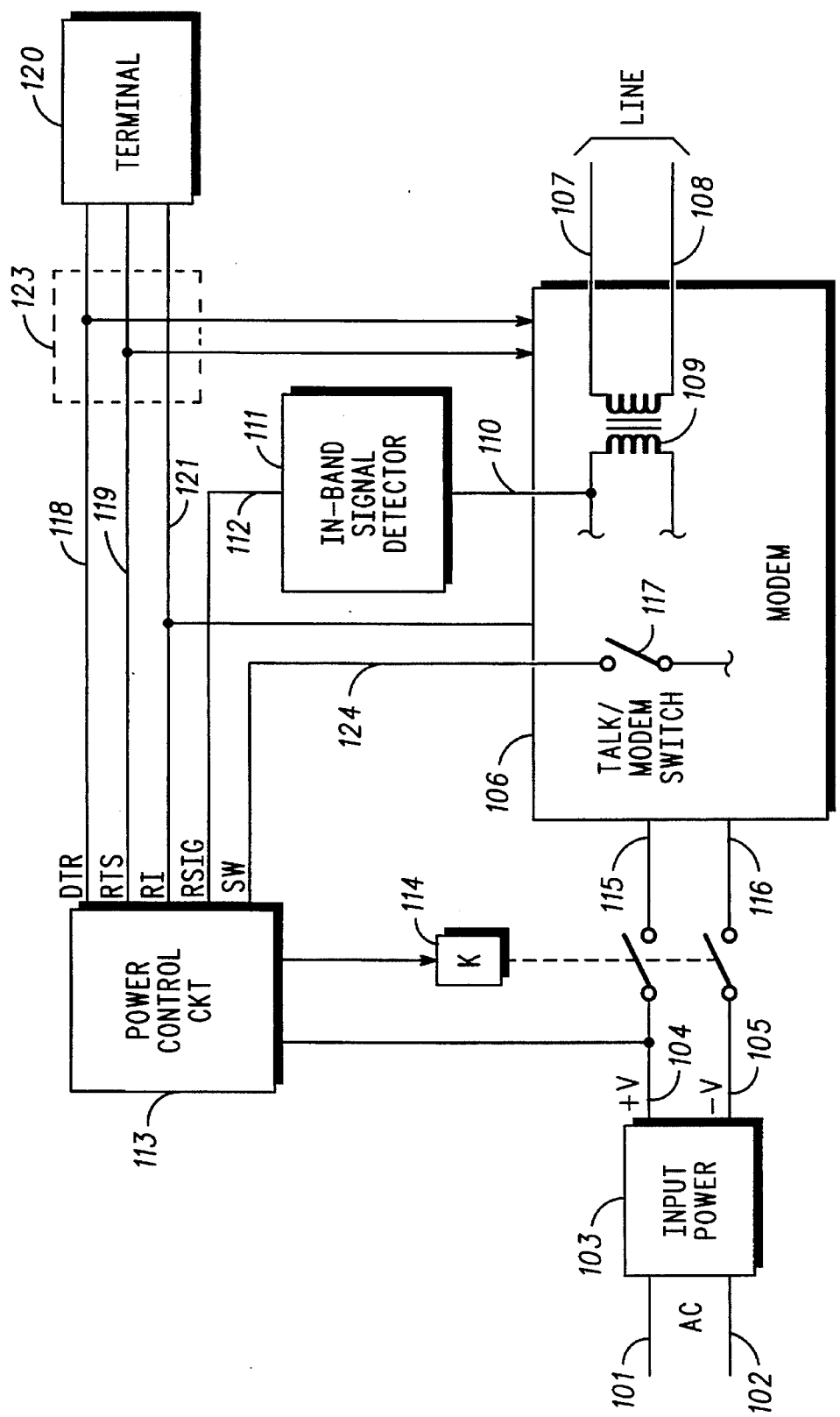
FIG. 1 shows a first embodiment of a modem powering apparatus, in accordance with the present invention.

Referring to FIG. 1 there is shown a modem 106 arranged with a power control circuit 113, in-band signal detector 111, power-control relay 114, input power circuit 103, and associated data terminal equipment ("terminal") 120. In one embodiment, the power control circuit 113 may be embodied, for example, by a suitably-programmed microprocessor.

Briefly, the power control circuit 113 is arranged for controlling the power flow to the modem 106, based on the modem's data activity. After initial data activity is established, the power control circuit monitors the modem to determine when the data activity ceases. When the power control circuit determines that modem activity is no longer present, it releases the power-control relay 114, thus powering-down the modem. The power control circuit then continues to monitor the modem 106 and terminal interface 123 to determine when data activity returns. When the power control circuit determines that modem activity has returned, it operates the power-control relay, thus powering-up the modem. Normal data activity now continues.

Referring still to FIG. 1, there is shown a modem 106 connected to a terminal 120 by means of an RS-232-type interface 123. As shown, the RS-232 interface includes a ring Indicate ("RI") signal 121, a data terminal ready ("DTR") signal 118, and a request to send ("RTS") signal 119. As shown the modem receives its power from an input power unit 103 by means of a first power lead designated "+V" (reference number 104) and a second power lead designated "−V" (reference number 105). Also, the power control circuit 113 is arranged to obtain its power via the +V lead 104. The monitor circuit is further arranged to control a relay K, reference number 114. As shown, when the relay is in its energized state, power is applied from the input power leads 104, 105 to the modem 106 by means of relay contacts 115,116 which are closed. In contrast, when relay K is in its released state, power to the modem is interrupted, as the contacts 115, 116 are open.

As shown, the modem 106 is coupled to a line consisting of a tip lead (reference number 107) and a ring lead (reference number 108). It will be appreciated that the line may either be a dial-up line or a dedicated line. In case the line 107, 108 is a dial-up line, it will be appreciated that the modem 106 may operate in the calling mode, manual mode, or answer mode. In case the line 107, 108 is a dedicated line, it will be appreciated that the modem 106 may operate in the transmit mode or the receive mode.

To begin, let it be assumed that the line 107, 108 is arranged for operating as a dial-up line.

First, let it further be assumed that the modem 106 is arranged for operating in a calling mode. In this calling mode, calling activity is typically initiated by the terminal 120 sending ASCII characters containing the number to be dialed and any other dialing commands over the RS-232 interface 123 to an auto dialer located inside the modem 106. After a call has been established, a data session will be established with a distant modem and terminal (not shown). At this point, the modem 106 will proceed in normal data activity with the far-end modem and terminal arrangement.

During this time of data activity, however, the power control circuit 113 will monitor the circuitry of FIG. 1 to determine the point of time when the data activity ceases; at such time, the modem 106 is deemed to enter a "no-activity" state.

In this case, i.e., the modem 106 operating in a calling mode, the power control circuit 113 determines that a "no-activity state" exists by determining when the DTR signal 118 supplied by the terminal 120 has remained in the low (false) state for a predetermined time. In one embodiment, for example, the predetermined time may be 120 seconds. In response to finding no-activity, the power control circuit 113 initiates a power-down process by releasing the relay 114, thereby powering-down the modem 106 by interrupting the power flow via the leads 115, 116.

During this time of no data activity, the power control circuit will continue to monitor the circuitry of FIG. 1 to determine the point of time when data activity returns; at such time, the modem 106 is deemed to enter a "return-to-activity" state.

In the present case, i.e., the modem 106 operating in a calling mode, after power-down the power control circuit 113 continues to monitor the DTR lead 118 to determine when data activity returns. Thus, the monitor circuit determines that a "return-to-activity state" exists when the DTR signal 118 returns to a high (true) state. In response to this condition, the power control circuit 113 initiates a power-up process by operating the relay 114, thereby restoring power to the modem 106 via the power leads 115, 116. Since the modem power-up is not instantaneous, the terminal equipment is arranged to wait for a predetermined time for the modem to stabilize before sending further data to the modem 106.

Second, let it be assumed that the calling modem 106 is arranged for operating in a manual mode. In this case, the user has chosen to manually dial the remote modem via the line 107, 108. As shown, the modem 106 includes a switch 117 having two positions, i.e., a "talk" state and a "modem" state, to connect the user's telephone set (not shown) to the line 107, 108 for dialing purposes.

In this case, i.e., the calling modem 106 arranged for operating in a manual mode, the power, control circuit 113 determines that a no-activity state exists by determining when the switch 117 remains in the modem state for a predetermined time. In one embodiment, for example, the predetermined time may be 120 seconds. Similar to above, in response to finding no-activity, the power control circuit 113 initiates the power-down process by releasing the relay 114, thereby interrupting power to the modem 106.

Further, upon determining that no-activity exists and powering-down the modem, the power control circuit 113 continues to monitor the switch 117 to determine when the modem 106 enters the return-to-activity state. Thus, the power control circuit 113 determines that a return-to-activity state exists by determining when the switch 117 enters the talk state. This transition corresponds to the user manually dialing the telephone digits necessary to establish a data session with a distant modem. At this time, the power control circuit 113 initiates the power-up process by operating the relay 114, thereby restoring power to the modem 106. Normal manual calling activity then proceeds. Since typically at least 5–10 seconds is needed for the user to manually input the address digits and for the public telephone network to establish a connection with the distant modem, the local modem 106 will have sufficient time to power up stabilize before the distant modem answers and seeks to establish a data session with the calling modem 106. The DTR signal 118 qualifies as activity and prevents power down during the subsequent data session.

Third, let it be assumed that the modem 106 is arranged for operating in an answer mode. In this mode, the modem 106 is arranged to determine the presence of an incoming ringing signal on the line 107, 108 and, in response thereto, to provide a corresponding ring indicate ("RI") signal 121 to the associated terminal 120.

In this case, i.e., the modem 106 operating in an answer mode, the power control circuit 113 determines that a no-activity state exists by determining when the incoming ringing signal is absent for a predetermined time. The power control circuit 113 determines this condition by determining when the RI signal 121 has remained in a low (false) state for the predetermined time. In one embodiment, for example, the predetermined time may be 120 seconds. In response to finding no-activity, the power control circuit 113 initiates a power-down process by releasing the relay 114, thereby interrupting power to the modem 106. Upon determining that no-activity exists, after powering-down the modem the power control circuit 113 continues to monitor the RI lead to determine the presence of an incoming ringing signal on the line 107, 108 and thus return the modem 106 to the active state. Thus, the monitor circuit determines that a "return-to-activity state" exists when the RI signal 121 returns to a high (true) state, thus indicating the presence of an incoming ringing signal on the line 107, 108. In response, the power control circuit 113 initiates a power-up process by operating the relay 114, thereby restoring power to the modem 106. As the incoming ringing signal is typically two seconds in length and the time required for the modem to stabilize after powering-up can be as short as 0.1 seconds, the powering-down process is essentially transparent to the answer modem function. The DTR signal 118 qualifies as activity and prevents power down during the subsequent data session.

Next, let it be assumed that the line 107, 108 is arranged for operating as a dedicated line.

Fourth, let it further be assumed that the modem 106 is arranged for operating in a transmit mode. In this mode, data transmission activity is typically initiated by the terminal 120 setting the RTS signal 119 to a high (true) state. In this case the power control circuit 113 determines that a "no-activity state" exists by determining when the RTS signal has remained in a low (false) state for a predetermined time. In one embodiment, for example, the predetermined time may be 120 seconds. In response, the power control circuit 113 initiates a power-down process by releasing the relay 114, thereby interrupting power to the modem 106.

Upon determining that a no-activity state exists and powering-down the modem, the power control circuit 113 continues to monitor the RTS lead to determine when data activity returns. Thus, the monitor circuit determines that a "return-to-activity" state exists when the RTS signal 119 returns to a high (true) state. In response, the power control circuit 113 initiates a power-up process by operating the relay 114, thereby restoring power to the modem 106. The terminal 120 typically does not send data to the modem until the RS-232 "clear to send" ("CTS") signal (not shown) from the modem is high. The CTS signal from the modem will not be high until the modem has been powered up, and stabilized. This insures the modem will be able to accept and transmit data arriving from the terminal. Subsequent RTS/CTS activity after powering-up functions in a normal manner. The RSIG signal 112 also qualifies as activity and prevents power down during the subsequent data session.

Fifth, let it be assumed that the modem 106 is arranged for operating in a receive mode. In this mode, an in-band signal detector 111 powered directly from the input power +V lead 104 is coupled to the modem line transformer 109 via the lead 110. Further, the detector 111 is arranged for determining when an in-band received signal is present on the line 107, 108 and, when such an in-band received signal is detected, to provide a corresponding "received signal" ("RSIG") indication 112 to the power control circuit 113. Thus arranged, the power control circuit 113 uses the RSIG indication 112 to determine if data activity is present on the line 107, 108. Thus, the power control circuit 113 determines when a no-activity state exists by determining when the RSIG indication 112 remains low (false) state for a predetermined time, thereby determining when an in-band received signal is absent from the line 107, 108 for the predetermined time. In one embodiment, for example, the predetermined time may be 120 seconds. In response, the power control circuit 113 initiates a power-down process by releasing the relay 114, thereby interrupting power to the modem 106.

Upon determining that no-activity exists and powering-down the modem, the power control circuit 113 continues to monitor the RSIG indication 112 to determine when an in-band signal returns to the line, thus returning the modem 106 to an active state. The power control circuit 113 thus determines that a return-to-activity state exists by determining the presence of an in-band received signal on the line corresponding to the RSIG indication 112 returning to a high (true) state. In response, the power control circuit 113 initiates a power-up process by operating the relay 114, thereby restoring power to the modem 106. Further, the transmitting modem (not shown) typically will, or can be made to, send pure tones prior to transmitting actual data to energize or train the receive modem 106. Using these preliminary incoming pure tones the in-band signal detector 111 generates a logic signal ("RSIG"), 112, to the power control circuit 113 which, in turn, causes the modem 106 to power-up and stabilize before the start of the incoming data. During the subsequent data session the RTS signal 119 also qualifies as activity and prevents power down.

While FIG. 1 shows a single coupling transformer 109 for dedicated line operation, the modem 106 may actually include a separate transmit and receive path and utilize two transformers. In the case of separate transmit and receive paths the in-band signal detector 111, will be coupled to the receive transformer. In one embodiment, for example, the in-band signal detector 111 may comprise the in-band signal detector circuitry shown in FIG. 2.

Figure 2:
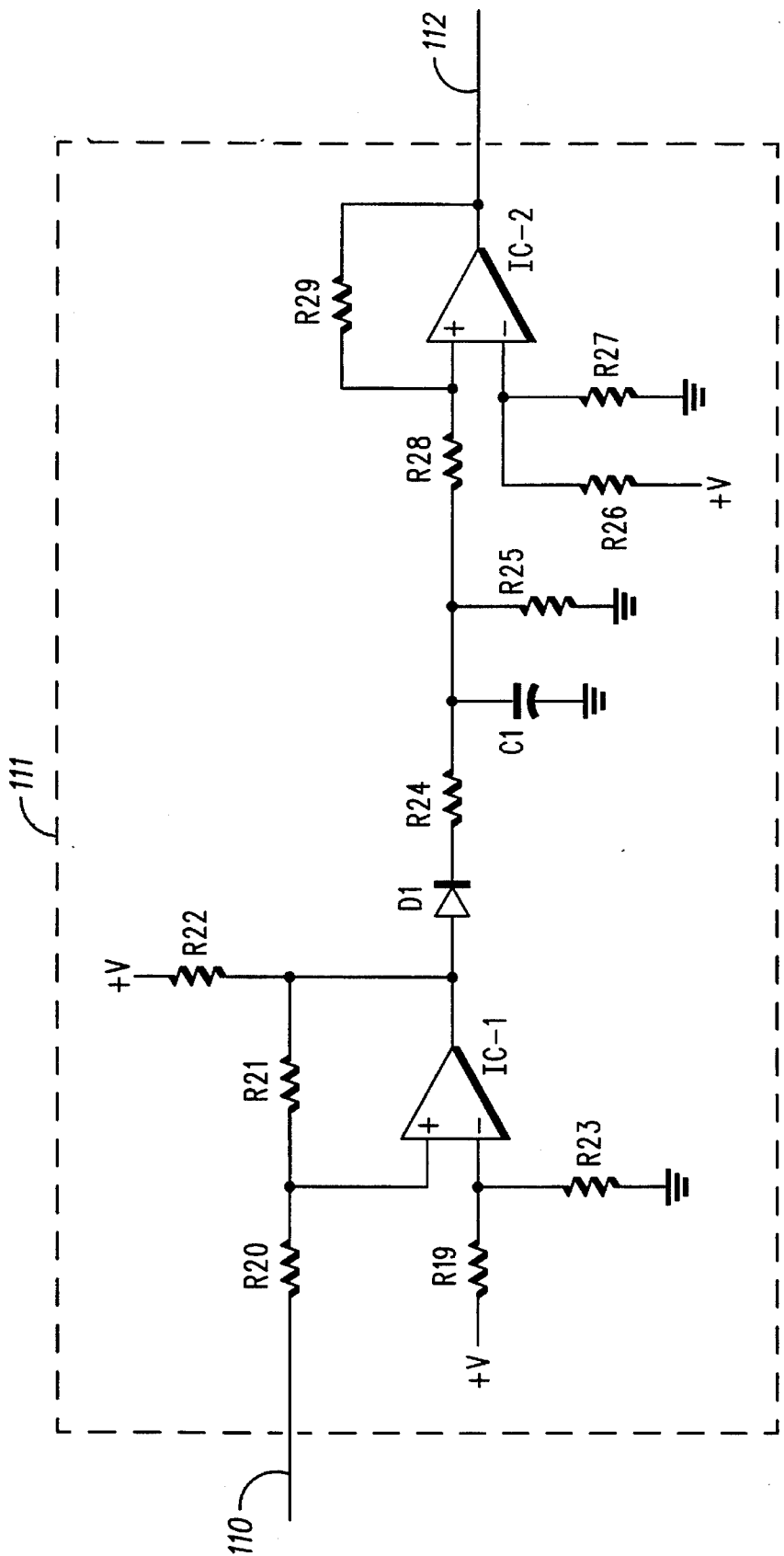
FIG. 2 is a circuit diagram for a signal detector 111 used in FIG. 1.

Referring to FIG. 2, it will be appreciated that the in-band signal detector 111 generally monitors the lead 110 and, responsive to detecting an in-band received signal on this lead 110, generates the corresponding RSIG signal on the lead 112.

Illustrative component values, part numbers ("p/n"), and suppliers are presented in the following TABLE A:

TABLE A

| symbol | value/ part no. (p/n) | units/ supplier |
| --- | --- | --- |
| R19 | 40.2 | Kil-Ohms |
| R20 | 10 | Kil-Ohms |
| R21 | 1 | Meg-Ohms |
| R22 | 10 | Kil-Ohms |
| R23 | 243 | Ohms |
| R24 | 6.8 | Kil-Ohms |
| R25 | 1 | Meg-Ohms |
| R26 | 10 | Kil-Ohms |
| R27 | 10 | Kil-Ohms |
| R28 | 10 | Kil-Ohms |
| R29 | 1 | Meg-Ohms |
| C1 | 0.047 | micro-Farad |
| D1 | p/n 1N914 | National Semiconductor |
| IC-1 | p/n MC3302P | Motorola, Inc. |
| IC-2 | p/n TL062CP | Motorola, Inc. |
| (END OF TABLE) | | |

A more detailed description of the in-band signal detector 111 of FIG. 2 follows:

As shown, the in-band signal detector 111 includes a first comparator designated IC-1 and a second comparator designated IC-2. The first comparator IC-1 is arranged for generating pulse signals when an in-band signal of sufficient energy is received from the modem receive transformer by means of the lead 110. Resistors R20 and R21 create hysteresis for the first comparator IC-1, and resistor R22 acts as a pull-up resistor for the open-collector output of the first comparator IC-1. Also, resistors R19 and R23 set a first threshold level for the first comparator IC-1.

As shown, a diode D1 rectifies the pulse signals generated by the first comparator IC-1, thus charging a capacitor C1 via a resistor R24. In turn, the capacitor C1 voltage is coupled to the second comparator IC-2 by means of a resistor R28. Resistors R28 and R29 create hysteresis for the second comparator IC-2, while resistor R25 provides a bleeding path for the discharge of the capacitor C1. A second threshold level for the second comparator IC-2 is set by resistors R26 and R27. As a result, the second comparator IC-2 generates the RSIG signal on lead 112 when the voltage across the capacitor C1 reaches this second threshold level.

In one embodiment, all resistors shown in FIG. 2 are ¼ watt 10% except for R19 and R23, which are ⅛ watt 1%. Capacitor C1 is rated at 50 volts with a 10% tolerance.

Figure 3:
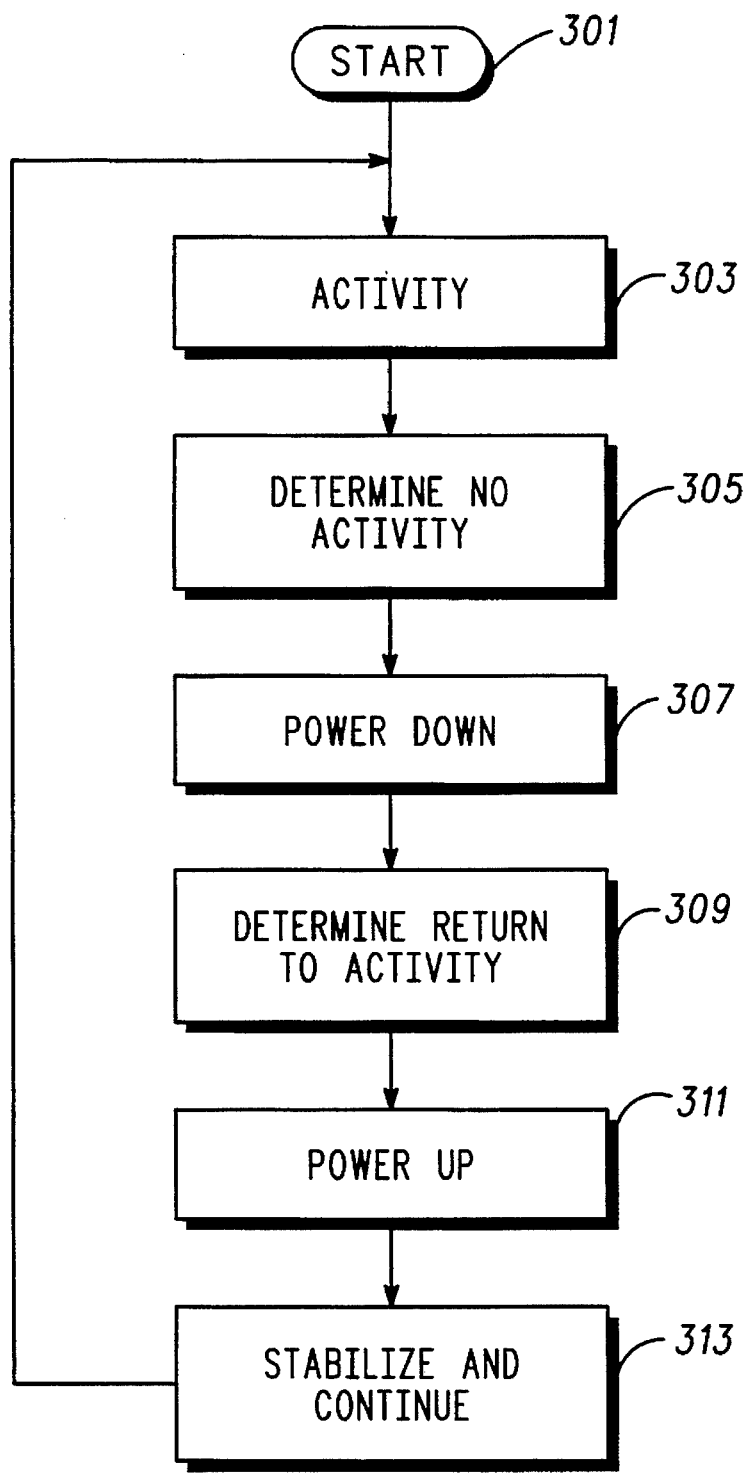
FIG. 3 is a flow diagram for FIG. 1.

Referring now to FIG. 3, there is shown a flow diagram for FIG. 1. The process is started, step 301, by turning "on" the modem 106, thus providing power, and thereupon conducting normal modem activity, step 303.

In step 305, the power control circuit 113 determines when no modem activity is present, and the modem 106 is thus in a "no-activity" state.

In response to step 305 determining that no modem activity is present, in step 307 the power control circuit 113 powers-down the modem 106.

In step 309, the power control circuit 113 determines when modem activity has returned, and the modem 106 is thus in a "return-to-activity" state.

In response to step 309 determining that modem activity has returned, in step 311 the power control circuit 113 powers-up the modem 106.

In step 313, after waiting for the modem 106 to stabilize, normal modem activity continues, step 303.

The following TABLE B shows the signals used by the power control circuit 113 to determine the "no-activity" and "return-to-activity" states for the various modem operating modes.

TABLE B

| modem mode | no-activity signal | return-to-activity signal |
| --- | --- | --- |
| A. calling | DTR remains low | DTR returns to high |
| B. manual | switch in modem position | switch in talk position |
| C. answer | no incoming ring signal | receive incoming ringing |
| D. transmit | RTS remains low | RTS returns to high |
| E. receive | no in-band received signal | receive in-band signal |
| (END OF TABLE) | | |

As shown, the table includes five (5) rows designated A–E. With cross-reference to FIG. 1, rows A–C depict the situation where the line 107, 108 is arranged as a dial-access line.

In rows A–B, there is depicted the situation where the modem 106 is a calling modem; thus, the modem 106 is arranged for operating in a calling mode. In row A, the power control circuit 113 determines the no-activity state by determining when the DTR signal 118 supplied by the terminal 120 remains low for a predetermined time. Also, the monitor determines the return-to-activity state by determining when the DTR signal returns to high.

In row B, the calling modem 106 is arranged for operating in a manual mode via the switch 117, the switch having a modem position (or state) and a talk position (or state). In this manual mode, the monitor determines the no-activity state by determining when the switch 117 remains in the modem state for a predetermined time. Also, the monitor determines the return-to-activity state by determining when the switch enters the talk state.

In row C, there is depicted the situation where the modem 106 is an answer modem; thus, the modem 106 is arranged for operating in an answer mode. The modem is further arranged for determining the presence of an incoming ringing signal on the line 107, 108. In this answer mode, the monitor determines the no-activity state by determining when the incoming ringing signal is absent for a predetermined time. Also, the monitor determines the return-to-activity state by determining the presence of an incoming ringing signal.

With further cross-reference to FIG. 1, rows D–E in TABLE B depict the situation where the line 107, 108 is arranged as a dedicated line.

In row D, there is depicted the situation where the modem 106 is arranged as a transmit modem; thus, the modem 106 is arranged for operating in a transmit mode. In this transmit mode, the monitor determines the no-activity state by determining when the RTS signal 119 supplied by the terminal 120 remains low for a predetermined time. Also, the monitor determines the return-to-activity state by determining when the RTS signal returns to high.

In row E, there is depicted the situation where the modem 106 is arranged as a receive modem; thus, the modem 106 is arranged for operating in a receive mode. In this receive mode, the monitor determines the no-activity state by determining when an in-band received signal is absent from the line 107, 108 for a predetermined time. Also, the monitor determines the return-to-activity state by determining the presence of an in-band received signal on the line.

The embodiment depicted in FIG. 1 was built and added to a low-speed frequency shift keying modem for functional testing. This modem had a power consumption of 4.82 watts in operational mode, and 1.77 watts when in the sleep mode. The 1.77 watts for sleep mode remained relatively constant for all modem types. Power consumption on some types of modems may be 10 watts or more. Electrical power cost varies around the country but presently a range of 5 to 10 cents per kilowatt-hour covers much of the country. As the cost of the additional circuitry required for the power-clown feature is approximately $2.00, in this range (5–10 cents per kilowatt-hour) the pay-back to the customer for any increased modem cost would occur in as little as a few months. After this time, the customer would receive a further annual modem power cost savings up to $7.22 per year in the case of a modem that used 10 watts in the awake mode.

As described above, the time period used for determining the no-activity state may be fixed at 120 seconds. In an alternate embodiment, additional circuitry may be provided to allow the user to vary the no-activity time period from 30–460 seconds. Also with this arrangement, the user may completely disable the power-down feature.

Thus there is disclosed a method and apparatus whereby a modem can power itself off when not in use and wake-up in short order to conduct normal modem operation, all with little or no impact on the modem user.

One advantage of a modem powering method and apparatus, in accordance with the present invention, over the prior art is that it is possible to build a full-featured modem that has potentially greater power savings than modems designed for continuous low-power consumption. Since many modems would spend significant amounts of time in the powered-down mode, the modem builder will have more flexibility to use readily available low-cost components with less concern about component power consumption. A modem powering method and apparatus, in accordance with the present invention, may be added to a variety of modems with minimal changes to the modem hardware, thus allowing re-use of existing circuit design.

While various embodiments of a modem powering method and apparatus, in accordance with the present invention, have been described hereinabove, the scope of the invention is defined by the following claims.

What is claimed is:

1. In an arrangement of a modem coupled to a terminal and a line, a method for powering the modem, the modem having a plurality of operating, modes including a calling mode, a manual mode, an answer mode, a transmit mode, and a receive mode, the method comprising the steps of:

(a) determining when no modem activity is present for at least one of said plurality of operating modes;

(b) when no modem activity is present, powering-down the modem;

(c) determining when modem activity has returned for at least one of said plurality of operating modes;

(d) when modem activity has returned, powering-up the modem; and (e) after modem activity has returned, waiting for the modem to stabilize before continuing normal modem activity.

2. The method of claim 1, the modem arranged for operating in the calling mode, and further arranged for receiving a data terminal ready signal from the terminal, the data terminal ready signal having a data terminal ready high state and a data terminal ready low state, the determining step (a) including a step of determining when the data terminal ready signal remains in the data terminal ready low state for a predetermined time.

3. The method of claim 2, the determining step (c) including a step of determining when the data terminal ready signal returns to the data terminal ready high state.

4. The method of claim 1, the modem arranged for operating in the calling mode, the modem including a manual switch having a modem state and a talk state, the determining step (a) including a step of determining when the manual switch remains in the modem state for a predetermined time.

5. The method of claim 4, the determining step (c) including a step of determining when the manual switch returns to the talk state.

6. The method of claim 1, the modem arranged for operating in the answer mode and further arranged for determining the presence of an incoming ringing signal from the line, the determining step (a) including a step of determining when the incoming ringing signal is absent for a predetermined time.

7. The method of claim 6, the determining step (c) including a step of determining the presence of an incoming ringing signal.

8. The method of claim 1, the line being arranged as a dedicated line, the modem arranged for operating in the transmit mode and further arranged for receiving a request to send signal from the terminal, the request to send signal having a request to send signal high state and a request to send signal low state, the determining step (a) including a step of determining when the request to send signal remains in the request to send signal low state for a predetermined time.

9. The method of claim 8, the determining step (c) including a step of determining when the request to send signal returns to the request to send signal high state.

10. The method of claim 1, the modem arranged for operating in the receive mode, the determining step (a) including a step of determining when an in-band received signal is absent from the line for a predetermined time.

11. The method of claim 10, the determining step (c) including a step of determining the presence of an in-band received signal on the line.

12. A modem powering apparatus, the modem having a plurality of operating modes, including a calling mode, a manual mode, an answer mode, a transmit mode, and a receive mode, the modem powering apparatus including a modem arranged for coupling to a terminal and a line, a relay arranged for controlling the power flow to the modem, and a power control circuit;

the power control circuit arranged for determining when no modem activity is present for at least one of said plurality of operating modes;

the power control circuit further arranged for releasing the relay and thus powering-down the modem when no modem activity is present;

the power control circuit further arranged for determining when modem activity has returned for at least one of said plurality of operating modes;

the power control circuit further arranged for operating the relay and thus powering-up the modem when modem activity has returned; and after modem activity has returned, the power control circuit further arranged for waiting for the modem to stabilize before continuing normal modem activity.

13. The modem powering apparatus of claim 12, the modem arranged for operating in the calling mode, and further arranged for receiving a data terminal ready signal from the terminal, the data terminal ready signal having a data terminal ready high state and a data terminal ready low state, the power control circuit arranged for determining when no modem activity is present by determining when the data terminal ready signal remains in the data terminal ready low state for a predetermined time, and further arranged for determining when modem activity has returned by determining when the data terminal ready signal returns to the data terminal ready high state.

14. The modem powering apparatus of claim 12, the modem arranged for operating in the calling mode, the modem including a manual switch having a modem state and a talk state, the power control circuit arranged for determining when no modem activity is present by determining when the manual switch remains in the modem state for a predetermined time, and further arranged for determining when modem activity has returned by determining when the manual switch returns to the talk state.

15. The modem powering apparatus of claim 12, the modem arranged for operating in the answer mode and further arranged for determining the presence of an incoming ringing signal from the line, the power control circuit arranged for determining when no modem activity is present by determining when the incoming during signal is absent for a predetermined time, and further arranged for determining when modem activity has returned by determining the presence of an incoming ringing signal.

16. The modem powering apparatus of claim 12, the line being arranged as a dedicated line, the modem arranged for operating in the transmit mode and further arranged for receiving a request to send signal from the terminal, the request to send signal having a request to send signal high state and a request to send signal low state, the power control circuit arranged for determining when no modem activity is present by determining when the request to send signal remains in the request to send signal low state for a predetermined time, and further arranged for determining when modem activity has returned by determining when the request to send signal returns to the request to send signal high state.

17. The modem powering apparatus of claim 12, the modem arranged for operating in the receive mode, the power control circuit arranged for determining when no modem activity is present by determining when an in-band received signal is absent from the line for a predetermined time, and further arranged for determining when modem activity has returned by determining the presence of an in-band received signal on the line.

* * * * *